United States Patent [19]

Mashida et al.

[11] 4,110,139
[45] Aug. 29, 1978

[54] PROCESS FOR PREPARING BANDS OR BELTS, PARTICULARLY SUITABLE FOR USE AS WATCH BANDS

[75] Inventors: Toru Mashida; Sumeo Matsushita, both of Tokyo; Iwao Ikegami, Ichikawa, all of Japan

[73] Assignee: NCO Works Ltd., Tokyo, Japan

[21] Appl. No.: 558,085

[22] Filed: Mar. 13, 1975

[30] Foreign Application Priority Data

| Mar. 13, 1974 | [JP] | Japan | 49-29456 |
| Apr. 22, 1974 | [JP] | Japan | 49-45676 |
| Apr. 23, 1974 | [JP] | Japan | 49-46296 |

[51] Int. Cl.² .......... B29D 27/00; B32B 5/18; B32B 5/24; B32B 5/30
[52] U.S. Cl. .......... 156/79; 2/311; 156/209; 156/245; 156/273; 264/26; 264/45.4; 264/46.4; 264/248; 264/255; 264/261; 264/293; 264/321; 264/225; 428/315
[58] Field of Search .......... 264/46.4, 25, 26, 225, 264/45.4, 248, 255, 261, 293, 321; 2/311; 156/79, 209, 245, 273; 428/315

[56] References Cited

U.S. PATENT DOCUMENTS

| 1,332,169 | 2/1920 | Ellis | 264/46.4 |
| 2,357,513 | 9/1944 | Harmon | 264/46.4 X |
| 2,526,311 | 10/1950 | Wilson | 264/46.4 X |
| 2,816,852 | 12/1957 | Banks | 264/46.4 X |
| 2,914,109 | 11/1959 | Hsu et al. | 264/26 |
| 2,946,713 | 7/1960 | Dusina et al. | 264/26 |
| 3,242,238 | 3/1966 | Edberg et al. | 264/26 |
| 3,242,238 | 3/1966 | Edberg et al. | 264/26 |
| 3,248,461 | 4/1966 | Wiles et al. | 264/25 X |
| 3,248,461 | 4/1966 | Wiles et al. | 264/25 X |
| 3,255,061 | 6/1966 | Dobbs | 264/46.4 X |
| 3,256,131 | 6/1966 | Koch et al. | 156/79 X |
| 3,262,805 | 7/1966 | Aoki | 156/79 X |
| 3,265,551 | 8/1966 | Ananian et al. | 264/26 X |
| 3,265,785 | 8/1966 | Rainer | 264/25 X |
| 3,272,688 | 9/1966 | Holmstrom et al. | 156/79 X |
| 3,423,263 | 1/1969 | Pannone | 156/79 |
| 3,515,612 | 6/1970 | Rauhut | 156/79 |
| 3,562,043 | 2/1971 | Eddy | 156/79 |
| 3,739,051 | 6/1973 | Smith | 264/225 X |
| 3,748,202 | 7/1973 | Itsaka et al. | 264/225 X |
| 3,791,906 | 2/1974 | Farkas | 264/26 X |
| 3,793,414 | 2/1974 | Buff et al. | 264/46.4 X |
| 3,937,774 | 2/1976 | Wiley et al. | 264/338 X |
| 3,962,013 | 6/1976 | Mashida | 264/26 X |

FOREIGN PATENT DOCUMENTS 950,262  2/1964  United Kingdom .......... 156/209

Primary Examiner—Philip Anderson
Attorney, Agent, or Firm—William Anthony Drucker

[57] ABSTRACT

This invention provides a process for preparing artificial leather bands or belts, particularly those suitable for use as watch bands or straps which are characterized by bearing close resemblance to natural leather in the appearance, feeling and touch and toughness of the product, inexpensive production cost and easiness in the production control. The present process comprises charging a half-finished laminated sheet in a substantially closed press mold of silicone rubber and heating said mold under pressure in a high frequency dielectric device, the inner surfaces of said mold bearing complementary embossed patterns to those to be embossed on the surfaces of said laminated sheet, said laminated sheet having a peripheral contour substantially similar to the inner peripheral contour of the recess defined in said mold and including an expandable material layer of thermoplastic resin, the periphery of said laminated sheet being sealed by heating, and at least a top surface layer of said laminated sheet being composed of a material capable of being pressed against the inner surfaces of said recess to be embossed thereon during the heating.

26 Claims, 10 Drawing Figures

PROCESS FOR PREPARING BANDS OR BELTS, PARTICULARLY SUITABLE FOR USE AS WATCH BANDS

BRIEF SUMMARY OF THE INVENTION

This invention relates to a process for preparing bands or belts particularly suitable as watch bands. Particularly, it relates to a process for preparing inexpensive bands or belts which bear close resemblance to those of high class in appearance, feeling and the like and which can be stored in half-finished laminates sheets capable of being molded immediately on demand.

Watch bands or straps of natural leather coated will alligator or lizard leather bear unique and elaborate feeling, and thus are appreciated highly. They have, however, a number of disadvantages. They are very expensive and are difficultly processed during the coating operation in a high frequency dielectric device because of the varied high frequency characteristic depending on the tanning and dyeing thereof. In the high frequency dielectric processing of natural leather, the electric control is complicated for which is required high skill, resulting frequently in damages by spark caused by the insufficient control.

It has been known to prepare watch bands of artificial leather bearing resemblance to the appearance of natural leather.

Conventionally known artificial leather watch bands have been prepared by sticking together top and back layers comprising artificial leather of thermosetting type or rubber leather which bears resemblance to natural leather by embossing them in a press mold, in a similar manner to the preparation of natural leather bands. Since such metal mold is engraved with a pattern, the resulting embossed articles have a pattern with limited elaboration and delicacy so that they have never been expected to have appearance and feeling resembling to those of articles of high class such as natural leather and the like. Since the articles are molded from a single sort of material, they are different from the natural leather in touch, tensile deformation, and flexibility and have poor temperature characteristics at hot and cold temperatures. In the molding of powdery material in a mold, portions of the resulting products are protruded from ends as in the rubber pressing, which requires inconveniently complicated aftertreatment to remove the fins. The resulting articles cannot resemble natural leather in feeling, flexibility, strength and the like as in the abovementioned pressed articles comprising top and back layers.

It has also been conventional to employ sheets, particularly synthetic resin sheet in place of powdery materials. In order to emboss the surfaces of synthetic resin sheets in such a case, the sheets are softened and passed through embossed rolls or pressed in a press mold comprising an embossed plate.

The synthetic resin sheets should be subjected not only to a pressure sufficiently high to emboss the pattern on the surfaces thereof but also to a sufficient heat treatment. Such requirements require excessive energy to make the process unfavorable from an economical view point. In addition, when a silicone rubber mold capable of embossing a particularly elaborated pattern is employed, the mold may be frequently damaged or worn out due to the excessively high pressure for the molding. Furthermore, the elaborate pattern embossed on the mold may be frequently deformed and distorted due to the excessive pressure and heat applied to the silicone rubber mold.

The present invention is intended to overcome such shortcomings in the conventional art.

It is an essential object of this invention to provide a process for preparing bands or belts suitable particularly for use as watch bands or straps which comprises charging a half-finished laminated sheet in a substantially closed press mold of silicone rubber and heating it under pressure in a high frequency dielectric device, the inner surfaces of said mold bearing complementary embossed patterns to those to be embossed on the surfaces of the molded products, said laminated sheet having a shape and size similar to those of said press mold and including an expandable thermoplastic material layer having a high dielectric loss, to be subjected to a cooperative effect of the air tightness of press mold with the expansion of said expandable material and which results in reduced requirements of heat and pressure applied to the mold than those in conventional procedures, and in close resemblance to natural leather.

It is another object of this invention to provide a process for preparing bands or belts wherein said laminated sheets can be stored as the semi-finished products and pressed immediately on demand so that the inventory control is suitably effected.

It is a further object of this invention to provide a process for preparing such bands or belts wherein said laminated sheet has at least the top surface layer thereof composed of an expandable material to be subjected to embossing in said silicone rubber press mold so that the resulting products have improved in low temperature characteristics and flexibility and having lusterless and luxurious surfaces bearing close resemblance to ostrich leather.

It is a still further object of this invention to provide a process for preparing such bands or belts having high flexibility and having extremely thin top and back faces without any partial blisters due to the gas generated from the intervening expandable layer at heating under pressure, by virtue of employment of non-woven fabrics between the top and/or back surface layers and said expandable layer to absorb said gas into said intervening non-woven fabrics.

Other objects of and advantages achieved by the present invention will be apparent from the following description with reference to the attached drawings.

BRIEF DESCRIPTION OF THE DRAWINGS

The attached drawings illustrate some embodiments of this invention, wherein.

DETAILED DESCRIPTION OF THE INVENTION

Figure 1:
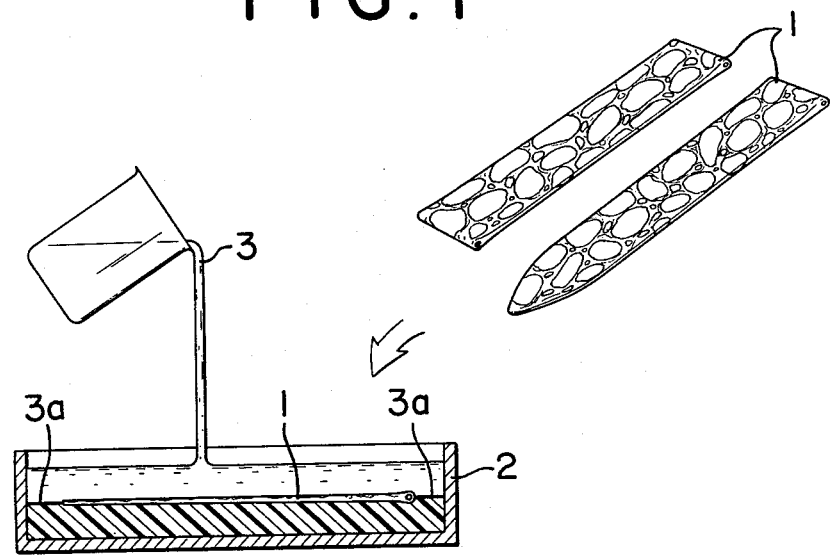
FIG. 1 illustrates a schematic view illustrating a process for forming a press mold of silicone rubber usable in the process of the present invention.
Figure 2:
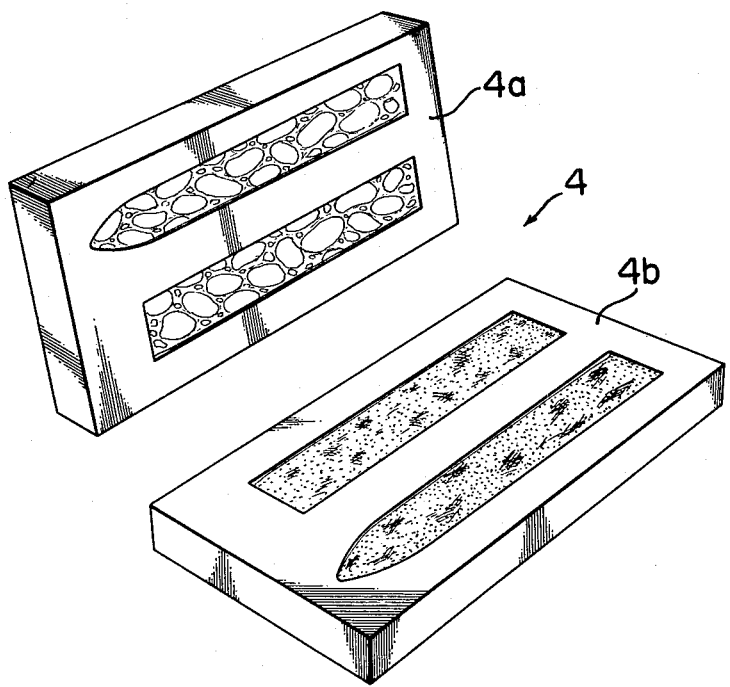
FIG. 2 shows a perspective view of paired parts of the press mold as prepared by the process shown in FIG. 1.

A silicone rubber press mold is employed for pressing bands of the present invention. As shown in FIG. 1, natural leather 1 such as alligator leather which has been conventionally tanned is stuck flatly on the bottom of mold 2. Liquid silicone rubber 3 of a slowly setting type comprising generally two or three-liquid type is poured onto said natural leather in the mold to obtain a press mold 4 comprising an upper part 4a which bears an embossed complementary pattern copying that of the original prototype and a lower part 4b which has a flat surface. Characteristics of silicone rubber are utilized very effectively to reproduce vividly and complementarily the exact unique pattern of the natural leather prototype with all minute lines and unevenness. In the present invention, the silicone rubber mold is of an enclosable male and female type, upper and lower type or split type.

Half-finished laminated sheets are employed for the material for forming the body of bands according to the present invention wherein the top surface layer comprises essentially a moldable material such as thermoplastic resin in silicone rubber press molds. The laminated sheets have the shape and size substantially resembling those of said press mold of silicone rubber, that is to say, the peripheral contour of the laminated sheet is substantially similar to the inner peripheral contour of the recess of said press mold. And the peripheral portion of said laminated sheet is sealed by means of high frequency dielectric heating. Moreover, said laminated sheet includes at least one expandable layer of sheet-like or powdery or granular thermoplastics having a high dielectric loss.

The half-finished laminated sheet is charged in the recess of a closed press mold and the pre-expanded, or a sponge-like composition is melt, foamed and expanded by high frequency dielectric heating. The mechanism for shaping in the present invention is characterized by embossing on at least one surface of the half-finished laminated sheet by pressing the surface against the inner surfaces of the silicone rubber press mold by the pressure generated in the recess by the expansion of the laminate. In order to permit the material to foam and expand in the recess by means of the high frequency dielectric heating, the thermoplastic synthetic resin should have a high dielectric loss and the foaming agent contained therein should have preferably a high polarity. In order to press effectively the surface of the sheet to be molded against the silicone rubber press mold by the action of inner pressure generated in the recess during the heating, the recess should be sufficiently air tight and enclosable. For this reason and in order to emboss the sufficiently elaborate pattern on the surfaces of the sheet, silicone rubber is employed as the material for the press mold. The enclosablility and air tightness can be maintained sufficiently even when small air vents are provided through the recess, since such vents have sufficiently high venting resistance. From the view point that the embossment is performed by the inner pressure generated in the recess, the feed in the recess is treated by means of the high frequency dielectric heating which is the most effective. Moreover, the expandable thermoplastic material having a high dielectric loss is melt, foamed and expanded to generate the inner pressure sufficient for the embossment in the recess. The pressure for enclosing the silicone rubber press mold may be as high as to prevent any protrusion out from the ends of the molded article. The sheet to be molded is heated, softened and expanded by the dielectric heating by the inner pressure in the recess and to be embossed easily on the surface thereof. The dielectric loss of the silicone rubber is too low to be affected during the heating. For example, the silicone rubber has a value of $\epsilon \tan\delta$ ranging from $3 \times 10^{-3}$ to $5 \times 10^{-3}$ at a frequency of $10^7$ so that the silicone rubber press mold is heated to a low extent. Moreover, since the pressure applied to the mold is sufficiently small as compared to that in conventional processes, the mold is less worn and damaged.

In short, the embossing molding in the present process is possible in indivisible relation of the four conditions of (1) the closed silicone rubber press mold, (2) the inner pressure developed by the foaming and expansion of the feed in the recess, (3) the high frequency dielectric heating system and the pre-expanded thermoplastic composition having a high dielectric loss and containing a foaming agent in combination, (4) sealing of the periphery of half-finished laminated sheet and (5) the shape and size of half-finished laminated sheet. In the absence of any one in the four conditions, the embossing molding cannot be achieved effectively and economically with complete reproducibility.

Figure 3:
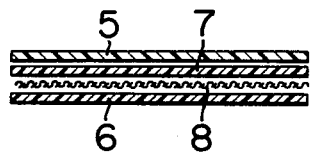
FIG. 3 shows a schematic sectional view of a laminate comprising a top surface layer, an expandable intervening layer, a reinforcing layer and a back surface layer in an embodiment of this invention.

The bands obtained by the process of this invention are characterized by the above-mentioned essential features. For more fully understanding, the present invention will be illustrated by several embodiments with reference to the attached drawings. FIGS. 3 to 6 illustrate a first embodiment. FIG. 3 shows a sectional view of the half-finished laminated sheet wherein the top surface layer 5 comprises a thermoplastic resin sheet and the back surface layer 6 comprises a themoplastic resin sheet or an artificial leather. The intervening thermoplastic resin material 7 between the top and back surface layers is suitably thermoplastic polyurethane resin or a copolymer thereof. Suitable artificial leather employed for the back surface of layer 6 may be polyurethane foam, polyvinyl chloride foam or Nylon (registered trade name) foam. Polyurethane is excellent in the temperature characteristics, abrasion resistance, tensile strength and the like and can be stuck together with other thermoplastic polyurethane as well as with artificial leather of thermosetting type by the high frequency dielectric technique, which simplifies the adhesion and punching operations. Numeral 7 is an expandable layer intervening between the top and back surface layers 5, 6 and numeral 8 is a reinforcing material thereof. Such a reinforcing material comprises generally high tensile synthetic resin film or natural or synthetic fiber or leather or the like, which is intended to reduce the deformation due to the elongation of bands. When artificial leather is employed for the back surface layer, such a reinforcing material may be eliminated. Said expandable material 7 comprises a synthetic resin sponge sheet, a synthetic resin sheet containing a foaming agent, or thermoplastic resin powder or granules. When a sponge sheet containing a foaming agent and having been partially foamed by part of said foaming agent is employed as such sponge sheet, particularly excellent effect can be achieved. A conbination of said sponge sheet containing a foaming agent and having been partly foamed by a part of said foaming agent with said thermoplastic resin powder may also be employed successfully.

Suitable thermoplastic resins for the expandable material include polyvinyl chloride and copolymers thereof, polyurethane and copolymer thereof, polyvinyl alcohol, Nylon (registered trade mark), natural rubber, Neoprene (registered trade mark) and the like which have high values of $\epsilon \tan\delta$. The suitable dielectric constant $\epsilon$ in the process of the present invention ranges from 2.3 to 20 and the value of $\tan\delta$ measured at room temperatures for $10^6$ to $10^7$ Hz ranges from $60 \times 10^{-4}$ to $18000 \times 10^{-4}$.

Suitable foaming agents usable in the resin include di-nitro-pentamethylenetetramine, di-methyl-dinitrosoterephthalamide, oxy-bis-benzenesulfonylhydrazide, azo-bis-isobutyronitril, azo-bis-formamide, toluenesulfonylhydrazide and the like. These foaming agents are high in polarity and are decomposed to produce foams in the resin mainly by the high frequency dielectric heating and probably by the sensible heat of molten resin. In both of the cases, the foaming agent can produce foams effectively in the resin by the dielectric heating. It is also possible to employ a promoter such as zinc white litharge, salts of fatty acid and the like.

In the heating of pre-expanded material, the existing foams, on one hand, are expanded by heating and the foaming agent, on the other hand, is decomposed to form new foams to be expanded. It has been found from the results of various experimentations that a pre-expanded composition wherein a part of the foaming agent has been decomposed to produce foams but another part of the same remains unchanged is effective.

The proportion of foaming agent usually ranges from 0.02 to 15% by weight, preferably from 0.7 to 1.2% by weight of the resin. In expandable pre-expanded materials wherein a part of the foaming agent has been decomposed to produce foams, excellent results were achieved in the experimentation employing a polyurethane sheet when the apparent specific gravity ranging from 0.08 to 0.9.

Figure 4:
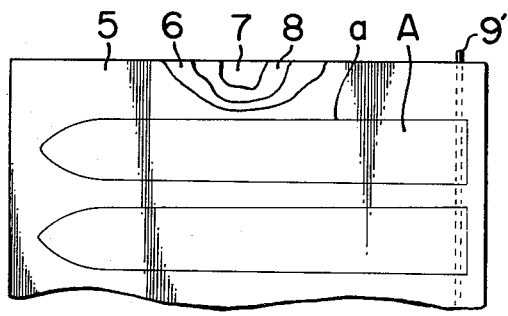
FIG. 4 is a partly broken plan view of a semi-finished laminate sheet under a blocked state.
Figure 5:
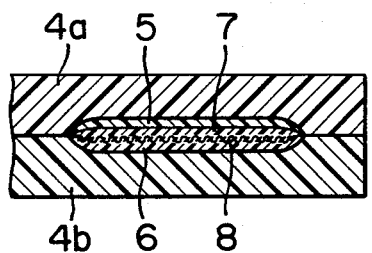
FIG. 5 is a schematic sectional view of the embodiment of a semi-finished laminate sheet in a press mold of silicone rubber.

The layers 5 to 8 are then laminated as shown in FIG. 3 and treated in a high frequency dielectric device to prepare the half-finished product A wherein the only peripheral portions thereof have been heat sealed together to form, for example, a thong part of watch band as shown in FIG. 4 and the peripheral portions have been molten away by the heat for sealing. The expandable material 7 and reinforcing layer 8 may be placed in a free state in the bag defined by heat sealing the circumferences of top and back surface layers 5, 6 independently thereof, provided that the reinforcing layer should be jointed to at least one of the surface layers at the free tip end or at the two tip ends in order to assure the reinforcement of the finished product. The intervening layers 7, 8 may also be heat sealed integrally together around the circumferences or stuck over the whole surfaces with the top and back surface layers 5, 6. The intervening layers 7, 8 may be inserted between the surface layers 5, 6 after the latter have been heat sealed together in said high frequency dielectric device. Moreover, one tip end of the half-finished product is provided with a bearing hole 9 for attaching the finished band to a watch case by inserting an intervening core 9' of a material which is not fused together with the laminated sheet material around the core such as a fluorine resin and which will be withdrawn from the finished product after the completion thereof.

The top and back surface layers 5, 6, expandable material 7 and reinforcing layer 8 may be punched either separately or concurrently to form the half-finished laminated sheet before sealing. When punched concurrently, preferably the layers may be previously bonded together totally or partly by means of an adhesive. When punched separately, the layers are combined and then bonded together.

In the process of this invention, bands are prepared by charging said half-finished sheet in a recess defined by the upper and lower parts of silicone rubber press mold 4a, 4b (see FIG. 5) and heating the mold with the laminated sheet under pressure in a high frequency dielectric device to expand the expandable material 8 to press the top and back surface layers 5, 6 against the inner surfaces of upper and lower parts 4a, 4b of the mold sufficiently to emboss the exact pattern of the mold 4. Suitable frequency in the dielectric heating ranges from 10M to 6000M Hz and suitable heating temperature ranges from 60° to 280° C. Said heating under pressure is effected usually for 3 to 600 seconds. Suitable pressure during the dielectric heating should be at least sufficient enough to maintain the press mold under tight condition even in the heating and expanding operation. Under the insufficient pressure, protrusions from the body frequently occur. The maximum pressure should be maintained to an extent that the press mold is maintained tight and the whole shape of the recess is not deformed significantly from the original shape during the heating operation. The upper and lower limits of said pressure depend on the nature of the mold, i.e., the shape and size or the area of engaged surfaces of upper and lower parts of the mold so that the range of pressure is specified independently for a particular silicone rubber press mold. It is thus impossible to define numerically the pressure range. Since, however, the silicone rubber press mold is of a substantially closed type, it is possible to reduce markedly the extents of heating and pressure in combination of the nature of the mold with the expansion action of the expandable material itself as compared with those in conventional flat silicon rubber press molds. In the conventional flat silicone rubber press mold, the gas generated by the decomposition of foaming agent does leak from the circumference of the mold due to the fact that the mold is not closed tightly to cause insufficient inner pressure for pressing the surface layers of a shaped article to be molded against the embossed surface of the mold. Hence, the embossed pattern on the surfaces of molded articles cannot be reproduced exactly. Particularly in the embossing of marked unevenness, the peaks and nadirs of the pattern cannot be reproduced exactly. According to the process of this invention, on the contrary, such a disadvantage can be overcome. Moreover, in the heating step, though the expandable material is expanded by foaming, the sealing portion blocks the expandable material from protruding out. Accordingly, the final product having neat and smooth periphery is obtained. Particularly in the case that the glossy sheet is used for the top surface layer, since the peripheral portion of said glossy sheet is not covered by expandable material, the final product having gloss on both whole top surface and side surface is obtained.

Even though the expandable material of the half-finished product is not completely enclosed by the sealing portion, as the number of expandable cells or pores in the peripheral portion of the expandable material is extremely decreased by sealing, the expandable material can not be protruding out from peripheral portion in the expanding step. The removal of protruded ends from the body can be eliminated completely which provided a problem in conventional molding operation.

The products obtained by the process of this invention are by no means inferior to those of high class such as natural leather selected as the prototype in feeling, flexibility and strength by selecting properly the materials, thickness, color and luster on the top and back surface layers. Due to the laminated structure, they have also moderate resilience and bear close resemblance in touch. The materials can be stocked as half-finished products so that the finished products can be embossed immediately on demand, thus, being very convenient for the inventory control.

Moreover, the back surface layer may be of a material which has been embossed. In such a case, a silicone rubber mold bearing the complementary pattern is employed for the upper part of the mold and a conventional flat mold may be employed for the lower part.

Figure 6:
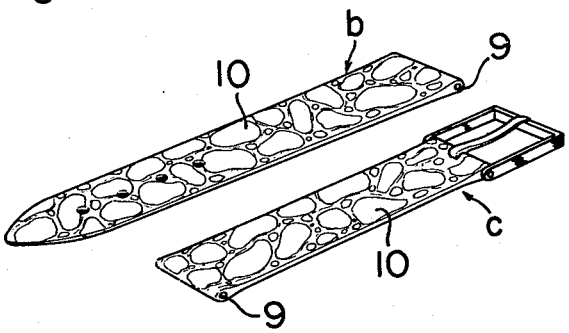
FIG. 6 is a perspective view of a pair of watch band obtained by the process of this invention.

FIG. 6 shows an embodiment of watch band 10 employing the molded product obtained by the present invention and comprising a thong b and a buckle band c.

Another embodiment of this invention will be further illustrated.

Figure 7:
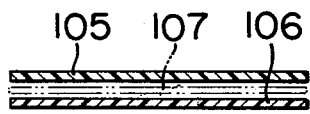
FIG. 7 is a schematic sectional view of a laminated sheet comprising a top surface layer, an expandable intervening layer and a back surface layer in another embodiment of the present invention.

In FIG. 7, the laminated sheet comprises a top surface layer 105 and a back surface layer 106. In this embodiment, the above-mentioned expandable material is employed as the top surface layer 105 and a thermoplastic resin sheet, artificial leather or the same expandable material as the top surface layer is employed as the back surface layer 106. The suitable expandable material may be a sheet of thermoplastic polyurethane or a copolymer thereof which contains a virgin foaming agent, a sponge sheet of thermoplastic polyurethane or a copolymer thereof which contains a foaming agent having been partly decomposed to produce the pre-expanded structure or thermoplastic polyurethane powder or granules or a copolymer thereof which contain a foaming agent. A reinforcing layer 107 is normally inserted or sandwiched therebetween in a similar manner to the preceding embodiment. The top and back surface layers 105, 106 are laminated as shown in FIG. 7 and heat sealed along the circumferences in a high frequency dielectric device as in the preceding embodiment to provide the half-finished product. By sealing as mentioned above, the density of the resin in the peripheral surface of the top surface layer 105 is high. In other words, the number of the expandable cells or pores in the peripheral surface of the top surface layer is extremely decreased by sealing and the peripheral surface of the top surface is relatively hard. The final product is prepared similarly to the manner as disclosed in the preceding embodiment by heating under pressure in an enclosed silicone rubber press mold 4 in a high frequency dielectric device to allow the surface layers to expand and to press against the complementarily embossed inner surfaces of upper and lower parts 4a, 4b of the mold to emboss the pattern thereon. In this heating step, the material of the periphery of the top surface layer is not irregularly protruded out and does not flow to the periphery of the back surface layer owing to the lack of the expandable pores as mentioned above.

The products prepared according to this embodiment have low thermal conductivity and good flexibility due to their pre-expanded structure containing minute foams on the surface and bear perfect resemblance to natural leather in touch. When a conventional band is put on the arm or the waist, the surface bending convexedly tends to hinder the bending of band. The bands prepared according to this embodiment have high flexibility sufficiently for matching with the arm or the waist to be put on the product. Different from the use of polyurethane sheet, artificial leather or the like, the apparent specific gravity can easily be approached to that of natural leather and the products have a weight as nearly much as that of natural leather. A further important feature is that since the minute foams present on the surface of products absorb light to reduce the reflection, the surface can bear substantially close resemblance to the mat surface of leather of highest class such as ostrich leather or the like.

Figure 8:
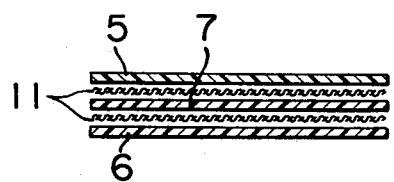
FIG. 8 is a schematic sectional view of a semi-finished laminated sheet comprising a top surface layer, an expandable intervening layer, intervening non-woven fabrics and a back surface layer in a further embodiment of the present invention.
Figure 9:
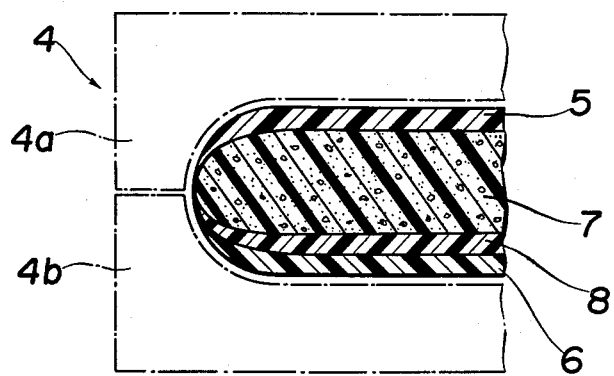
FIG. 9 is a partial sectional view illustrating the peripheral portion of the half-finished product of the laminated sheet shown in FIG. 3 and FIG. 4
Figure 10:
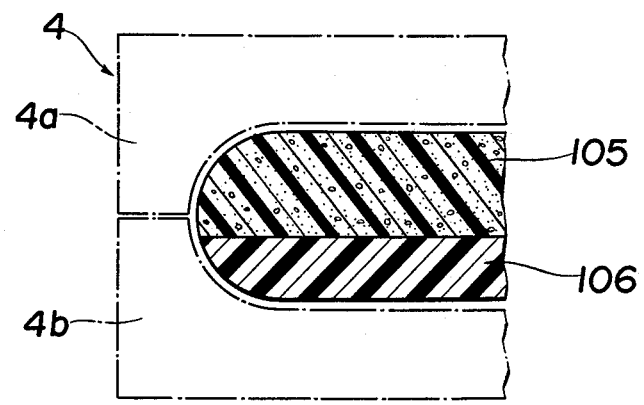
FIG. 10 is a partial sectional view illustrating the peripheral portion of the half-finished product of the laminated sheet shown in FIG. 7.

A still further embodiment of this invention will be illustrated with reference to FIG. 8. The materials and structure in this embodiment are similar to those in the preceding first embodiment except that non-woven fabrics 11 are inserted each between the intervening expandable material 7 and top and back surface layers 5, 6. The non-woven fabrics include filaments and powder of a material such as polyester, Nylon (registered trade mark), polyurethane, Vinylon (a trade mark of polyvinylformal). When the laminated sheet comprises an expandable material 7 in direct contact with the top and/or back surface layers 5, 6, the gas developed from the expandable material by heating under pressure may accumulate at the vicinity of such contact areas to blister outwardly from the thin top and/or back surface layers or may frequently break the surface layers to deteriorate the appearance of the product. The inclusion of such non-woven fabric cloths can have an effect to prevent such troubles. This will result probably from the fact that there occurs some absorption of the expanded gas developed in the inner portion enclosed in a bag defined by the heat sealing of the circumferences of top and back surface layers into the intervening non-woven fabric cloths. At all events, since no blister is developed on the top and back surface layers, the thickness of surface layers can be as small as possible to improve the flexibility and to reduce the weight of the product. Moreover, since the non-woven fabrics are embedded between other materials in such condition that portions of the expandable material and top or back surface layer are integrally heat merged together, the insertion of unwoven cloths results in improved mechanical strength of the product.

This invention will be now illustrated by way of the following examples.

EXAMPLE 1

An elongated tape-like laminated sheet was prepared by laminating a polyurethane sheet having a thickness of 0.3mm as the top surface layer, a pre-expanded sheet which had been partly foamed composed of a blend comprising polyurethane pellets and azo-bis-isobutyronitrile in an amount of 1% by weight of the pellets and had an apparent specific gravity of 0.9 as the expandable material and an artificial leather such as Cralino (registered trade name), Corfam (registered trade name) or the like prepared by laminating a grain side layer on a non-woven fabric cloth comprising Nylon or polyurethane fibers and its resin powder as the back surface layer. The laminated sheet was punched into a cassette-like structure. The laminated sheet was punched into a shape and size similar to those of the recess defined by a silicone rubber press mold for a pair of watch bands to prepare the half-finished product, which was then charged into the recess of the mold, the inner surface of upper and lower parts of the mold being embossed with a shape and complementary pattern of alligator leather bands. The charged half-finished product was heated under pressure by a high frequency dielectric device to allow said expandable material to expand. The finished product bore close resemblance to the prototype, particularly in the pattern luster and touch on the top surface.

EXAMPLE 2

An elongated laminated sheet was prepared by laminating the same pre-expanded sheet as in Example 1 as the top surface layer and the same artificial leather as in Example 1 as the back surface layer and punched into a cassette structure. A half-finished product having a shape and size similar to those of the prototype was prepared and charged into a silicone rubber press mold, the recess defined by the upper and lower parts of the mold being embossed with the complementary pattern of the prototype of a baby calf leather waist belt. The charged half-finished product was treated similarly to the process as described in Example 1 to obtain a product bearing close resemblance to the prototype in the pattern, luster and touch on the surface.

What we claim is:

1. A process for preparing bands of belts, particularly those suitable for use as watch bands comprising steps of:
   (a) manufacturing a substantially air tight press mold comprising at least two parts adapted to form a recess between said two parts and bearing complementary patterns of a prototype on at least one surface of said recess by setting liquid silicone rubber of slowly setting type poured onto the prototype,
   (b) preparing a half-finished product of a laminated sheet and sealing the periphery of said laminated sheet by a high frequency dielectric heating means, said laminated sheet comprising at least one layer of an expandable thermoplastic material with a foaming agent having a large dielectric loss and at least one surface layer of a material substantially capable of being embossed by said press mold into a pattern similar to said prototype pattern in the recess, a peripheral contour of said laminated sheet being substantially similar to the inner peripheral contour of said recess,
   (c) inserting said half-finished product into said recess of the press mold and maintaining the press mold air tight under pressure, and
   (d) heating said half-finished product in said press mold in a high frequency dielectric device to permit said expandable thermoplastic material to expand by foaming so that the resulting inner pressure pressed the top back surface layers of the half-finished product against the inner surface of said recess to emboss at least the one surface layer.

2. A process as claimed in claim 1 wherein said expandable thermoplastic material is a pre-expanded sheet of synthetic thermoplastic resin containing a foaming agent which has not been decomposed.

3. A process as claimed in claim 1 wherein said expandable thermoplastic material is a synthetic thermoplastic resin sheet containing a foaming agent which has not been decomposed.

4. A process as claimed in claim 1 wherein said expandable thermoplastic material is a pre-expanded thermoplastic sheet containing a foaming agent which has been partly decomposed.

5. A process as claimed in claim 1 wherein said expandable thermoplastic material is a granular thermoplastic resin containing a foaming agent.

6. A process as claimed in claim 1 wherein said expandable thermoplastic material comprises a pre-expanded thermoplastic sheet containing a foaming agent which has been partly decomposed and a layer of granular thermoplastic resin.

7. A process for forming bands or belts as claimed in claim 1 wherein said laminated sheet of the half-finished product comprises a top surface layer of thermoplastic resin, a back surface layer of thermoplastic resin or artificial leather, and said expandable thermoplastic material with a foaming agent which is sandwiched between said top surface layer and back surface layer.

8. A process as claimed in claim 7 wherein said top surface layer comprises thermoplastic polyurethane or a copolymer thereof and said back surface layer comprises thermoplastic polyurethane or artificial leather.

9. A process for preparing bands or belts as claimed in claim 7, wherein the peripheries of said top and back surface layers are integrally sealed by said high frequency dielectric heating means and said expandable thermoplastic material layer with a foaming agent is sandwiched between said top and back surface layers in said preparing and sealing step.

10. A process for preparing bands or belts as claimed in claim 7 further comprising inserting a reinforcing layer between said top and back surface layers for substantially reinforcing said laminated sheet.

11. A process for preparing bands or belts as claimed in claim 7 comprising sandwiching at least one sheet of non-woven fabric cloth between the top and/or back surface layers and said expandable thermoplastic material layer with a foaming agent.

12. A process for preparing bands or belts as claimed in claim 11 wherein said top surface layer comprised thermoplastic polyurethane or a copolymer thereof and said back surface layer comprises thermoplastic polyurethane, a copolymer thereof, or artificial leather.

13. A process for preparing bands or belts as claimed in claim 1 wherein said laminated sheet of the half-finished product comprises a top surface layer of expandable material with a foaming agent, a back surface layer of thermoplastic resin.

14. A process for preparing bands or belts as claimed in claim 1 wherein said laminated sheet of the half-finished product comprises a top surface layer of expandable thermoplastic material with a foaming agent, a back surface layer of artificial leather.

15. A process for preparing bands or belts as claimed in claim 1 wherein said laminated sheet of the half-finished product comprises a top surface layer of expandable thermoplastic material with a foaming agent, a back surface layer of a expandable material with a foaming agent.

16. A process as claimed in claim 13 said expandable thermoplastic material comprises a sheet of thermoplastic polyurethane or a copolymer thereof containing a foaming agent.

17. A process as claimed in claim 14 said expandable thermoplastic material comprises a sheet of thermoplastic polyurethane or a copolymer thereof containing a foaming agent.

18. A process as claimed in claim 15 said expandable thermoplastic material comprises a sheet of thermoplastic polyurethane or a copolymer thereof containing a foaming agent.

19. A process as claimed in claim 13 wherein said expandable thermoplastic material comprises a pre-expanded sheet of thermoplastic polyurethane or copolymer thereof containing a foaming agent which has been partly decomposed to produce the pre-expanded structure.

20. A process as claimed in claim 14 wherein said expandable thermoplastic material comprises a pre-expanded sheet of thermoplastic polyurethane or a copolymer thereof containing a foaming agent which has been partly decomposed to produce the pre-exanded structure.

21. A process as claimed in claim 15 wherein said expandable thermoplastic material comprises a pre-expanded sheet of thermoplastic polyurethane or a copolymer thereof containing a foaming agent which has been partly decomposed to produce the pre-expanded structure.

22. A process as claimed in claim 13 wherein said laminated sheet further comprises a layer of granular thermoplastic polyurethane or copolymer thereof containing a foaming agent which is sandwiched between said top and back surface layers.

23. A process as claimed in claim 14 wherein said laminated sheet further comprises a layer of granular thermoplastic polyurethane or copolymer thereof containing a foaming agent which is sandwiched between said top and back surface layers.

24. A process as claimed in claim 15 wherein said laminated sheet further comprises a layer of granular thermoplastic polyurethane or copolymer thereof containing a foaming agent which is sandwiched between said top and back surface layers.

25. A process for preparing bands or belts as claimed in claim 12 wherein said laminated sheet further comprises a reinforcing material which is sandwiched between said top and back surface layers for substantially reinforcing said laminated sheet.

26. A process for preparing bands or belts as claimed in claim 12 wherein the peripheries of said top and back surface layers are integrally sealed by said high frequency dielectric heating means to produce said half-finished product in said preparing and sealing step.

* * * * *